United States Patent
Kinugasa et al.

[11] Patent Number: 5,778,667
[45] Date of Patent: Jul. 14, 1998

[54] METHOD AND A DEVICE FOR PURIFYING COMBUSTION EXHAUST GAS

[75] Inventors: Yukio Kinugasa, Susono; Takaaki Itou, Mishima; Naoto Suzuki, Susono, all of Japan

[73] Assignee: Toyota Jidosha Kabushiki, Kaisha, Aichi, Japan

[21] Appl. No.: 876,608

[22] Filed: Jun. 16, 1997

[30] Foreign Application Priority Data

Jun. 18, 1996 [JP] Japan .................................. 8-157041

[51] Int. Cl.$^6$ .................................. F01N 3/20; F01N 3/36
[52] U.S. Cl. .................................. 60/274; 60/286; 60/301; 423/213.7
[58] Field of Search .................. 60/274, 276, 286, 60/301, 303; 422/182, 183; 423/213.2, 213.7

[56] References Cited

U.S. PATENT DOCUMENTS

| | | |
|---|---|---|
| 3,767,764 | 10/1973 | Dolbear . |
| 3,810,361 | 5/1974 | Weaving et al. ............. 60/288 |
| 3,953,576 | 4/1976 | Meguerian et al. ............. 423/213.7 |
| 4,321,792 | 3/1982 | Archard ............. 60/276 |
| 4,393,031 | 7/1983 | Henke ............. 423/239 |
| 4,854,123 | 8/1989 | Inoue ............. 60/286 |
| 5,021,227 | 6/1991 | Kobayashi et al. ............. 60/286 |
| 5,367,875 | 11/1994 | Aboujaoude et al. ............. 60/286 |
| 5,406,790 | 4/1995 | Hirota et al. ............. 60/276 |
| 5,410,873 | 5/1995 | Tashiro ............. 60/286 |
| 5,473,887 | 12/1995 | Takeshima et al. ............. 60/276 |
| 5,540,047 | 7/1996 | Dahlheim et al. ............. 60/286 |
| 5,605,042 | 2/1997 | Stutzenberger ............. 60/286 |
| 5,609,026 | 3/1997 | Berriman et al. ............. 60/286 |
| 5,628,186 | 5/1997 | Schmelz ............. 60/286 |

FOREIGN PATENT DOCUMENTS

| | | |
|---|---|---|
| WO93/07363 | 4/1993 | European Pat. Off. . |
| 4-365920 | 12/1992 | Japan . |
| 5-131118 | 5/1993 | Japan . |
| 6-108827 | 4/1994 | Japan . |
| 6-330741 | 11/1994 | Japan . |
| 8-4522 | 1/1996 | Japan . |

*Primary Examiner*—Willis R. Wolfe
*Attorney, Agent, or Firm*—Kenyon & Kenyon

[57] ABSTRACT

In the present invention, the No. 1 cylinder of an engine is connected to a first exhaust passage and the No. 2 to No. 4 cylinders are connected to a second exhaust passage. A three-way catalyst and a $NO_x$ absorbent are disposed in the first and second exhaust passage, respectively. A denitrating catalyst is disposed in a common exhaust passage to which the first and second exhaust passage merge. The $NO_x$ absorbent absorbs $NO_x$ when the No. 2 to No. 4 cylinders are operated at a lean air-fuel ratio, and is regenerated, i.e., releases and reduces the absorbed $NO_x$ when the No. 2 to No. 4 cylinders are operated at a rich air-fuel ratio. However, $NO_x$, without being reduced, is released from the $NO_x$ absorbent during a short period at the beginning of the regenerating operation. In the present invention, the No. 1 cylinder is operated at a rich air-fuel ratio during the short period at the beginning of the regenerating operation in order to produce $NH_3$ at the three-way catalyst. Therefore, when $NO_x$ without being reduced is released from the $NO_x$ absorbent and flows into the denitrating catalyst on the common exhaust passage, $NH_3$ produced at the three-way catalyst is also supplied to the denitrating catalyst. Thus, $NO_x$ released from the $NO_x$ absorbent at the beginning of the regenerating operation is reduced at the denitrating catalyst by $NH_3$ produced at the three-way catalyst.

5 Claims, 6 Drawing Sheets

METHOD AND A DEVICE FOR PURIFYING COMBUSTION EXHAUST GAS

BACKGROUND OF THE INVENTION

1. Field of the Invention

The present invention relates to a method and a device for purifying an exhaust gas from an internal combustion engine. More specifically, the invention relates to a device which is capable of removing $NO_x$ in the exhaust gas from a lean burn engine at a high efficiency.

2. Description of the Related Art

An exhaust gas purification device utilizing a three-way reducing and oxidizing catalyst (hereinafter referred to as a "three-way catalyst") is commonly used for removing HC, CO and $NO_x$ components from the exhaust gas of an internal combustion engine (in this specification, the term $NO_x$ means a nitrogen oxide such as NO, $NO_2$, $N_2O$ and $N_2O_4$, in general). The three-way catalyst is capable of oxidizing HC and CO components, and reducing $NO_x$ components in the exhaust gas, when the air-fuel ratio of the exhaust gas is the stoichiometric air-fuel ratio. Namely, the three-way catalyst is capable of removing these harmful components from exhaust gas simultaneously when the air-fuel ratio of the exhaust gas is the stoichiometric air-fuel ratio (In this specification, an air-fuel ratio of the exhaust gas at a certain point is defined by a ratio of the air and the fuel which are supplied to the intake system or the combustion chambers and the exhaust passage upstream of the point. Therefore, when no air or fuel is supplied in the exhaust passages upstream of the considered point, the air-fuel ratio of the exhaust gas at the point becomes the same as the air-fuel ratio of the air-fuel mixture supplied to the intake system or the combustion chambers).

However, the ability of the three-way catalyst for reducing $NO_x$ components becomes lower as the air-fuel ratio of the exhaust gas becomes lean (i.e., as the air-fuel ratio becomes higher than the stoichiometric air-fuel ratio). Therefore, it is difficult to remove $NO_x$ components in the exhaust gas from a lean burn engine which is operated at, as a whole, a lean air-fuel ratio using a three-way catalyst.

To solve this problem, International Patent Publication No. WO 93-7363 discloses an exhaust gas purification device utilizing a $NO_x$ absorbent which absorbs $NO_x$ in an exhaust gas when an air-fuel ratio of the exhaust gas is lean and releases the absorbed $NO_x$ and reduces the same when the air-fuel ratio of the exhaust gas becomes rich.

The device in the '363 publication disposes the $NO_x$ absorbent in an exhaust gas passage of a lean burn engine and removes $NO_x$ in the exhaust gas by absorbing it by the $NO_x$ absorbent. Further, when the amount of $NO_x$ absorbed in the $NO_x$ absorbent increases, the engine is operated at a rich air-fuel ratio for a short time in order to prevent the $NO_x$ absorbent from being saturated with the absorbed $NO_x$. When the engine is operated at a rich air-fuel ratio, an exhaust gas having a rich air-fuel ratio flows into the $NO_x$ absorbent, and $NO_x$ absorbed in the $NO_x$ absorbent is released. Further, the released $NO_x$ reacts with HC and CO in the exhaust gas on the $NO_x$ absorbent and is reduced to $N_2$ and $H_2O$. Hereinafter, this operation for causing the releasing of the absorbed $NO_x$ and the reduction of the same is referred to as "a regenerating operation" of the $NO_x$ absorbent.

However, during the regenerating operation of the $NO_x$ absorbent, it is found that "a $NO_x$ spillage" occurs in which $NO_x$ flows out from the $NO_x$ absorbent without being reduced. As explained above, it was considered that the $NO_x$ released from the $NO_x$ absorbent is reduced by HC and CO in the rich air-fuel ratio exhaust gas on the $NO_x$ absorbent and, therefore, $NO_x$ does not flow out from the $NO_x$ absorbent without being reduced. However, in the actual operation, it is found that the $NO_x$ spillage sometimes occurs. Also it is found that the amount of the $NO_x$ spillage becomes larger as the amount of $NO_x$ absorbed in the $NO_x$ absorbent is larger or the volume of $NO_x$ absorbent is larger. Further, it is found that the $NO_x$ spillage is likely to occur when the temperature of the $NO_x$ absorbent is high and degree of richness of the exhaust gas is low (i.e., the air-fuel ratio of the exhaust gas is relatively high).

Although the reason why the $NO_x$ spillage occurs is not clear at present, it is considered that the $NO_x$ spillage occurs due to an unbalance of the amount of HC and CO supplied to the $NO_x$ absorbent and the amount of the $NO_x$ released from the $NO_x$ absorbent during the regenerating operation.

When the regenerating operation starts, the concentration of oxygen near the surface of the $NO_x$ absorbent suddenly becomes low due to inflowing rich air-fuel ratio exhaust gas. As explained later, the $NO_x$ absorbent holds the absorbed $NO_x$ within the absorbent in the form of nitric acid ions combined with such as alkaline earth metals (for example, barium Ba). When the oxygen concentration near the surface of the $NO_x$ absorbent becomes low, the nitric acid ions held in the absorbent near the surface thereof are released from the absorbent in the form of $NO_x$ simultaneously. Therefore, a relatively large amount of $NO_x$ is released in a short time when the regenerating operation starts. Thus, a large part of HC and CO in the inflowing exhaust gas is used up for reducing $NO_x$ released from the portion of the absorbent near the exhaust gas inlet and the exhaust gas reaching the downstream portion of the absorbent contains very small amounts of HC and CO. Consequently, due to a shortage of HC and CO, the $NO_x$ released from the downstream portion of the absorbent and the $NO_x$ contained in the inflowing exhaust gas flow out from the $NO_x$ absorbent without being reduced, and the $NO_x$ spillage occurs.

After all the nitric acid ions near the surface are released, nitric acid ions are supplied to the surface of the absorbent from the inner portion of the absorbent. However, in this case, the rate at which $NO_x$ is released from the surface of the absorbent is determined by the speed at which the nitric ions move within the absorbent. This speed, i.e., the rate at which $NO_x$ is released is determined by the temperature of the $NO_x$ absorbent and the gradient of the concentration of the nitric acid ions within the absorbent.

Therefore, once all of the nitric acid ions near the surface of the absorbent are released, $NO_x$ is released from the absorbent at a relatively low rate corresponding to the moving speed of the nitric acid ions within the absorbent. Therefore, when a certain time has elapsed after the air-fuel ratio of the inflowing exhaust gas becomes rich (i.e., after all of the $NO_x$ near the surface of the absorbent is released), all of the $NO_x$ released from the absorbent is reduced by HC, CO contained in the exhaust gas and $NO_x$ does not flow out from the $NO_x$ absorbent. Therefore, after a short time has elapsed from the start of the regenerating operation, the $NO_x$ spillage from the $NO_x$ absorbent stops.

However, if the spillage occurs at the beginning of every regenerating operation, the amount of $NO_x$ released to the atmosphere increases.

SUMMARY OF THE INVENTION

In view of the problems in the related art as set forth above, the object of the present invention is to provide a method and a device for purifying exhaust gas using $NO_x$ absorbent which is capable of preventing the worsening of exhaust emission due to $NO_x$ spillage from the $NO_x$ absorbent.

This object is achieved by the method for purifying combustion exhaust gas according to the present invention which comprises a step for contacting an exhaust gas having a lean air-fuel ratio with a $NO_x$ absorbent to cause the $NO_x$ absorbent to absorb $NO_x$ in the exhaust gas, wherein the $NO_x$ absorbent absorbs $NO_x$ in an exhaust gas when an air-fuel ratio of an exhaust gas is lean and releases the absorbed $NO_x$ when an air-fuel ratio of an exhaust gas becomes rich and wherein the $NO_x$ absorbent releases the absorbed $NO_x$ without reducing it during a short period after an air-fuel ratio of an exhaust gas is changed from a lean air-fuel ratio to a rich air-fuel ratio and releases the absorbed $NO_x$ after reducing it to $N_2$ and $H_2O$ after the short period lapsed, a step for causing the air-fuel ratio of the exhaust gas contacting the $NO_x$ absorbent to be a rich air-fuel ratio in order to make the $NO_x$ absorbent release the absorbed $NO_x$, a step for supplying $NH_3$ to the exhaust gas after it contacts the $NO_x$ absorbent during the short period in which the $NO_x$ absorbed in the $NO_x$ absorbent is released without being reduced and a step for contacting the exhaust gas, after $NH_3$ is added to it, with a $NO_x$ purifying means which reduces $NO_x$ in the exhaust gas by reacting the $NO_x$ with $NH_3$ in the exhaust gas to, thereby reduce the $NO_x$ released from the $NO_x$ absorbent, in the short period, by the $NO_x$ purifying means.

According to another aspect of the present invention, there is provided a device for purifying a combustion exhaust gas comprising, a $NO_x$ absorbent disposed on an exhaust gas passage, the $NO_x$ absorbent absorbs $NO_x$ in an exhaust gas when an air-fuel ratio of an exhaust gas is lean and releases the absorbed $NO_x$ when an air-fuel ratio of an exhaust gas becomes rich and wherein the $NO_x$ absorbent releases the absorbed $NO_x$ without reducing it during a short period after the air-fuel ratio of the exhaust gas is changed from a lean air-fuel ratio to a rich air-fuel ratio and releases the absorbed $NO_x$ after reducing it to $N_2$ and $H_2O$ after the short period lapsed, $NO_x$ purifying means disposed on the exhaust gas passage downstream of the $NO_x$ absorbent and for reducing $NO_x$ in an exhaust gas by reacting it with $NH_3$, air-fuel ratio adjusting means for adjusting the air-fuel ratio of the exhaust gas flowing into the $NO_x$ absorbent to a lean air-fuel ratio in order to make the $NO_x$ absorbent absorb $NO_x$ in the exhaust gas, and for adjusting the air-fuel ratio of the exhaust gas flowing into the $NO_x$ absorbent to a rich air-fuel ratio in order to make the $NO_x$ absorbent release the absorbed $NO_x$ and a $NH_3$ supply means for supplying $NH_3$ to the exhaust gas in the exhaust gas passage at the portion between the $NO_x$ absorbent and the $NO_x$ purifying means during the short period in which the $NO_x$ absorbed in the $NO_x$ absorbent is released without being reduced, thereby the $NO_x$ purifying means reduces the $NO_x$ released from the $NO_x$ absorbent without being reduced during the short period.

According to these aspects of the present invention, $NO_x$ released from the $NO_x$ absorbent during the period of the $NO_x$ spillage is reduced by the $NO_x$ purifying means and does not diffuse into the atmosphere.

Namely, in the above-mentioned aspects of the present invention, when the regenerating operation of the $NO_x$ absorbent starts, i.e., when the air-fuel ratio of the exhaust gas flowing into the $NO_x$ absorbent is changed from a lean air-fuel ratio to a rich air-fuel ratio, ammonia ($NH_3$) is supplied to the exhaust gas flowing out from the $NO_x$ absorbent before it flows into the $NO_x$ purifying means. The $NO_x$ spillage occurs at the beginning of the regenerating operation and the exhaust gas flowing out from the $NO_x$ absorbent contains a relatively large amount of $NO_x$.

Most of $NO_x$ contained in the exhaust gas is composed of NO (nitric monoxide) and $NO_2$ (nitric dioxide) components. NO and $NO_2$ react with $NH_3$ on the $NO_x$ purifying means and causes the following denitrating reaction.

$$4NH_3 + 4NO + O_2 \rightarrow 4N_2 + 6H_2O$$

$$8NH_3 + 6NO_2 \rightarrow 7N_2 + 12H_2O$$

Therefore, $NO_x$ flows out from the $NO_x$ absorbent during the $NO_x$ spillage period at the beginning of the regenerating operation is reduced to $N_2$ and $H_2O$ by the $NO_x$ purifying means. As explained later, denitrating catalyst, for example, can be used as the $NO_x$ purifying means.

According to another aspect of the present invention, there is provided a device for purifying an exhaust gas from an internal combustion engine having a plurality of cylinder groups, each of the cylinder groups consists of one or more cylinders, the device comprising a first exhaust gas passage connected to one cylinder group of the engine, a second exhaust gas passage connected to another cylinder group of the engine, a common exhaust gas passage to which the first and the second exhaust gas passage merge, a $NH_3$ generating means disposed on the first exhaust gas passage for converting at least a part of $NO_x$ in an exhaust gas to $NH_3$ when an air-fuel ratio of an exhaust gas is a rich air-fuel ratio, a $NO_x$ absorbent disposed on the second exhaust gas passage, wherein the $NO_x$ absorbent absorbs $NO_x$ in an exhaust gas when an air-fuel ratio of an exhaust gas is lean and releases the absorbed $NO_x$ when an air-fuel ratio of an exhaust gas becomes rich and the $NO_x$ absorbent releases the absorbed $NO_x$ without reducing it during a short period after the air-fuel ratio of the exhaust gas is changed from a lean air-fuel ratio to a rich air-fuel ratio and releases the absorbed $NO_x$ after reducing it to $N_2$ and $H_2O$ after the short period lapses, $NO_x$ purifying means disposed on the common exhaust gas passage and for reacting $NO_x$ with $NH_3$ in an exhaust gas to, thereby, reduce $NO_x$ in the exhaust gas, a first air-fuel ratio adjusting means for operating the cylinder group connected to the second exhaust gas passage at a lean air-fuel ratio in order to make the $NO_x$ absorbent absorb $NO_x$ in the exhaust gas, and operating the same at a rich air-fuel ratio in order to make the $NO_x$ absorbent release the absorbed $NO_x$, a second air-fuel ratio adjusting means for operating the cylinder group connected to the first exhaust gas passage at a rich air-fuel ratio during the short period in which the $NO_x$ absorbed in the $NO_x$ absorbent is released without being reduced to, thereby, reduce the $NO_x$ released from the $NO_x$ absorbent by the $NO_x$ purifying means.

In this aspect of the invention, a $NO_x$ absorbent is used in an exhaust gas purification device for an internal combustion engine, and $NH_3$ is produced by a $NH_3$ generating means by converting $NO_x$ in the exhaust gas to $NH_3$ and the produced $NH_3$ is supplied to the $NO_x$ purifying means. A three-way catalyst, for example, can be used as the $NH_3$ generating means since the three-way catalyst converts a part of $NO_x$ in the exhaust gas to $NH_3$ when the air-fuel ratio of the exhaust gas is rich. When the air-fuel ratio of the cylinders connected to the second exhaust gas passage is switched from a lean air-fuel ratio to a rich air-fuel ratio, the rich air-fuel ratio exhaust gas is supplied to the $NO_x$ absorbent and the regenerating operation of the $NO_x$ absorbent starts. At the beginning of the regenerating operation, $NO_x$ is spilled from the $NO_x$ absorbent without being reduced. The cylinders connected to the first exhaust gas passage are also operated at a rich air-fuel ratio during the period in which the $NO_x$ spillage occurs. Therefore, a rich air-fuel ratio exhaust gas is supplied to the $NH_3$ generating means and $NO_x$ in the exhaust gas is converted into $NH_3$. Therefore, $NH_3$ is supplied to the $NO_x$ purifying means during the $NO_x$ spillage period and the $NO_x$ released from the $NO_x$ absorbent is reduced on the $NO_x$ purifying means by reaction with $NH_3$. Thus, according to this aspect of the invention, $NO_x$ released from the $NO_x$ absorbent during $NO_x$ spillage period does not diffuse into the atmosphere. Further, according to this aspect of the invention, since $NH_3$ is produced from the exhaust gas of the engine, means for storing $NH_3$ is not required.

BRIEF DESCRIPTION OF THE DRAWINGS

The present invention will be better understood from the description as set forth hereinafter, with reference to the accompanying drawings in which:

FIGS. 3(A)–(H) are timing diagrams showing an exhaust gas purifying method used in the device in FIG. 1;

FIGS. 7(A)–(H) are timing diagrams showing an exhaust gas purifying method used in the device in FIG. 6.

DESCRIPTION OF THE PREFERRED EMBODIMENT

Hereinafter, embodiments of the present invention will be explained in detail with reference to the accompanying drawings.

Figure 1:
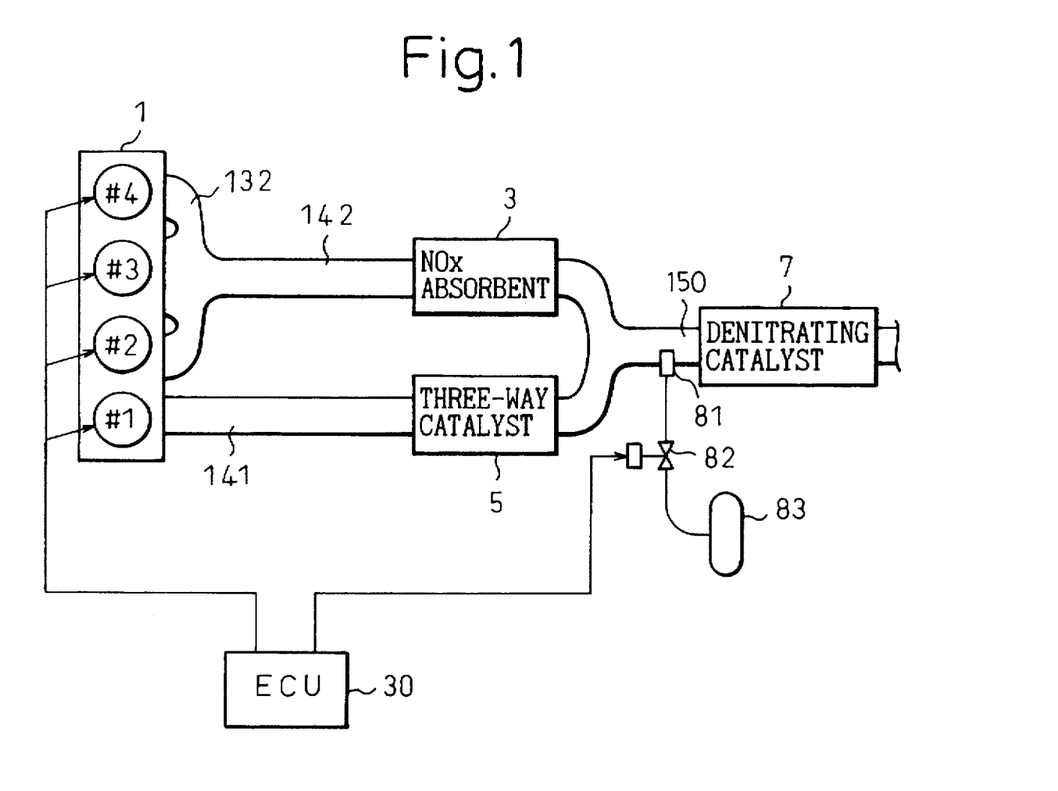
FIG. 1 schematically illustrates the general configuration of an embodiment of the exhaust gas purification device according to the present invention.

FIG. 1 shows a general configuration of an embodiment of the present invention when it is applied to a vehicle engine. In FIG. 1, reference numeral 1 designates a multiple-cylinder type internal combustion engine for an automobile. In this embodiment, the engine 1 is a 4-cylinder engine having No. 1 through No. 4 cylinders. Cylinders of the engine 1 are divided into two cylinder groups having independent exhaust gas passages. Namely, No. 1 cylinder of the engine 1 forms one cylinder group and other 3 cylinders No. 2 to No. 4 form another cylinder group. An exhaust port of No. 1 cylinder is connected to a first exhaust gas passage 141, and the exhaust ports of the cylinder group No. 2 to No. 4 are connected to a second exhaust gas passage 142 via an exhaust manifold 132.

In FIG. 1, reference numeral 5 is a three-way catalyst disposed in the first exhaust gas passage 141 which functions as $NH_3$ supply means or $NH_3$ generating means. In the second exhaust gas passage 142, a $NO_x$ absorbent 3 which will be explained later is disposed. The first exhaust gas passage 141 and the second exhaust gas passage 142 merge into a common exhaust gas passage 150 at the portion downstream of the three-way catalyst 5 and the $NO_x$ absorbent 3.

In this embodiment, a denitrating catalyst 7 and a secondary air nozzle 81 are disposed in the common exhaust gas passage 150. The denitrating catalyst 7 functions as $NO_x$ purifying means in this embodiment.

The secondary air nozzle 81 is connected to a pressurized air source 83 such as an air pump or a pressurized air tank via a control valve 82. When the control valve 82 opens in response to a control signal from a control unit 30, secondary air is supplied to the common exhaust gas passage 150 at the portion upstream of the denitrating catalyst 7.

The engine control unit (ECU) 30 in this embodiment is comprised of a microcomputer of a known configuration including a RAM, ROM, CPU, input port, and output port connected with each other by a bi-directional bus. In this embodiment, the ECU 30 performs basic control of the engine 1 such as the fuel injection control and the ignition timing control, and the ECU 30 in this embodiment further functions as the air-fuel ratio adjusting means to perform the regenerating operation of the $NO_x$ absorbent 3 by controlling the air-fuel ratio of the cylinders No. 1 to No. 4.

For these controls, signals representing the operating condition of the engine such as the intake airflow amount, engine speed and engine coolant temperature are supplied to the input port of the ECU 30 from various sensors not shown in the drawing. Further, the output port of the ECU 30 is connected to the fuel injection valve and ignition plug of the cylinders No. 1 to No. 4 via a fuel injection circuit and ignition circuit. Also, the output port of the ECU 30 is connected to the control valve 82 of the secondary air nozzle 81 to control the amount of secondary air supplied to the denitrating catalyst 7 during the regenerating operation of the $NO_x$ absorbent 3.

The $NO_x$ absorbent 3 performs an absorbing and releasing operation of $NO_x$ in the exhaust gas. Namely, when the cylinders No. 2 to No. 4 are operated at a lean air-fuel ratio, the $NO_x$ absorbent 3 absorbs $NO_x$ in the exhaust gas from these cylinders and, when the air-fuel ratio of the cylinders No. 2 to No. 4 is switched to a rich air-fuel ratio, the $NO_x$ absorbent 3 releases the absorbed $NO_x$ and reduces it to $N_2$ and $H_2O$.

The $NO_x$ absorbent 3 in this embodiment uses, for example, an alumina as a carrier and, on this carrier, precious metals such as platinum (Pt) and at least one substance selected from alkali metals such as potassium (K), sodium (Na), lithium (Li) and cesium (Cs); alkali-earth metals such as barium (Ba) and calcium (Ca); and rare-earth metals such as lanthanum (La) and yttrium (Y) are carried.

Though the mechanism of this absorbing and releasing operation of the $NO_x$ absorbent is not clear at present, it is thought that the absorbing and releasing operation is conducted by the following mechanism. Though the following mechanism of the absorbing and releasing operation of the $NO_x$ absorbent is explained for the case where platinum Pt and barium Ba are carried on the carrier, as an example, it is thought that a similar mechanism also applies even if other precious metal, alkali metals, alkali earth metals, or rare earth metals are used.

Namely, when the concentration of $O_2$ in the exhaust gas increases, i.e., when the excess air ratio λ of the exhaust gas becomes larger than 1.0, the oxygen $O_2$ in the exhaust gas is deposited on the surface of platinum Pt in the form of $O_2^-$ or $O^{2-}$. The NO in the exhaust gas reacts with $O_2^-$ or $O^{2-}$ on the surface of the platinum Pt and becomes $NO_2$ by the reaction $2NO+O_2 \rightarrow 2NO_2$. Then, $NO_2$ in the exhaust gas and the $NO_2$ produced on the platinum Pt are further oxidized on the surface of platinum Pt and absorbed into the $NO_X$ absorbent while bonding with the barium oxide BaO and diffusing in the absorbent in the form of nitric acid ions $NO_3^-$. Thus, $NO_X$ in the exhaust gas is absorbed by the $NO_X$ absorbent 3 when the excess air ratio λ of the exhaust gas is larger than 1.0.

On the other hand, when the oxygen concentration in the exhaust gas becomes low, i.e., when the excess air ratio λ of the exhaust gas becomes λ≦1.0, the production of $NO_2$ on the surface of the platinum Pt is lowered and the reaction proceeds in an inverse direction ($NO_3^- \rightarrow NO_2$), and thus nitric acid ions $NO_3^-$ in the absorbent are released in the form of $NO_2$ from the $NO_X$ absorbent 7.

In this case, if a reducing substance such as $NH_3$ and CO, or a substance such as HC and $CO_2$ exist in the exhaust gas, released $NO_X$ is reduced on the platinum Pt by these components. Namely, the $NO_X$ absorbent 3 performs the absorbing and releasing operation of the $NO_X$ in which the $NO_X$ in the exhaust gas is absorbed by the $NO_X$ absorbent when the excess air ratio of the exhaust gas λ is λ>1.0 (lean) and, released from the $NO_X$ absorbent and reduced to $N_2$ when excess air ratio λ of the exhaust gas becomes λ≦1.0.

In this embodiment, No. 2 to No. 4 cylinders are normally operated at a lean air-fuel ratio (λ>1.0) so that $NO_X$ in the exhaust gas is absorbed by the $NO_X$ absorbent and, thereby, is removed from the exhaust gas. However, when the amount of $NO_X$ absorbed in the $NO_X$ absorbent 3 increases, barium oxide BaO in the $NO_X$ absorbent 3 is saturated with nitric acid ions. Once the BaO is saturated with nitric acid ions, the $NO_X$ absorbent 3 cannot absorb $NO_X$ any more. Therefore, to maintain a large $NO_X$ absorbing capability of $NO_X$ absorbent 3, a regenerating operation for causing the $NO_X$ absorbent 3 to release the absorbed $NO_X$ is required. In this embodiment, the regenerating operation of the $NO_X$ absorbent 3 is carried out by operating No. 2 to No. 4 cylinders at a rich air-fuel ratio (λ≦1.0) when it is required (for example, when the amount of $NO_X$ absorbed in the $NO_X$ absorbent 3 reaches a predetermined value).

However, as explained before, the $NO_X$ spillage occurs at the beginning of the regenerating operation. Namely, when the excess air ratio λ of the exhaust gas flowing into the $NO_X$ absorbent 3 is switched from λ>1.0 to λ≦1.0, nitric acid ions $NO_3^-$ held by barium oxide BaO near the surface of the absorbent are released in the form of $NO_2$ immediately after the excess air ratio of the exhaust gas is switched, and a part of $NO_2$ released from the absorbent flows out from the $NO_X$ absorbent without being reduced.

In this embodiment, No. 1 cylinder is operated at a rich air-fuel ratio at the beginning of the regenerating operation to supply a rich air-fuel ratio exhaust gas to the three-way catalyst 5 so that a part of $NO_X$ in the exhaust gas is converted into $NH_3$ by the three-way catalyst 5. The $NO_X$ released from $NO_X$ absorbent 3 during the $NO_X$ spillage period and the $NH_3$ produced by the three-way catalyst 5 are both supplied to the denitrating catalyst 7 and, thereby, $NO_X$ is reduced by $NH_3$ on the denitrating catalyst 7.

Next, the mechanism of the conversion of $NO_X$ into the $NH_3$, performed by the three-way catalyst 5 and the reduction of $NO_X$ by the denitrating catalyst 7, are explained in brief.

The three-way catalyst 5 uses, for example, a honeycomb type substrate made of cordierite, and a thin alumina layer which acts as a carrier for the catalyst is coated on the surface of the substrate. On this carrier, precious metals such as platinum Pt, rhodium Rh, and palladium Pd are carried. The three-way catalyst 5 converts HC, CO, $NO_X$ in the exhaust gas at a high efficiency when the air-fuel ratio of exhaust gas is the stoichiometric air-fuel ratio (i.e., excess air ratio λ=1.0). The conversion efficiency of HC and CO becomes higher than that at the stoichiometric air-fuel ratio when the air-fuel ratio becomes lean (λ>1.0). Conversely, the conversion efficiency of $NO_X$ becomes higher than that at the stoichiometric air-fuel ratio when the air-fuel ratio becomes rich (λ<1.0).

Figure 2:
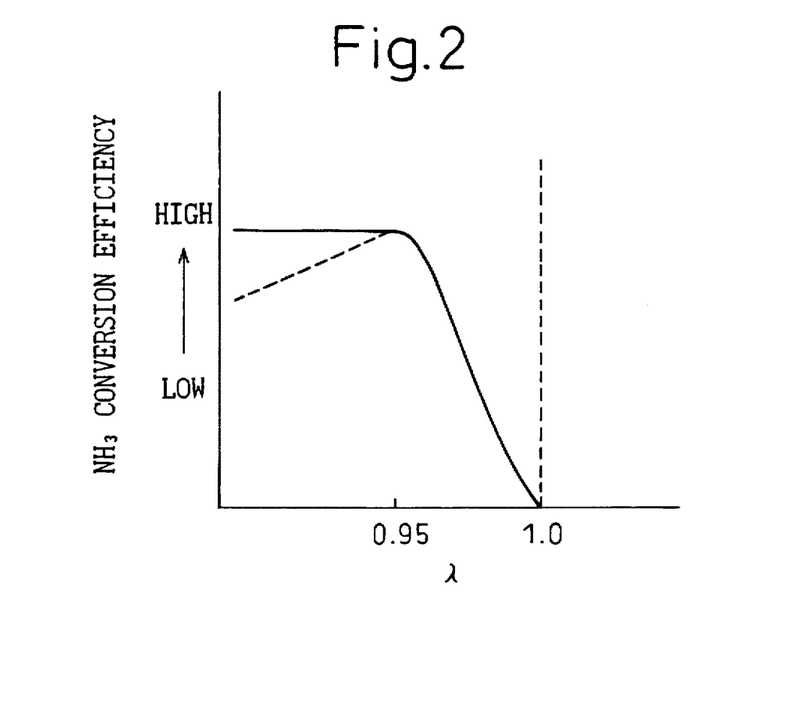
FIG. 2 is a graph showing a typical change in conversion efficiency of $NO_x$ to $NH_3$ by a three-way catalyst in accordance with the change in the excess air ratio of the engine.

As stated before, most of the $NO_X$ in the exhaust gas from the engine 1 consists of NO. When λ is smaller than 1.0 (i.e., when the air-fuel ratio of the exhaust gas is rich), a part of this NO is converted by the three-way catalyst 5 by reducing reactions and However, the remaining NO is converted into $NH_3$ by the reaction FIG. 2 shows the changes in the conversion efficiency of $NO_X$ into $NH_3$ by the three-way catalyst 5 in accordance with the change in the excess air ratio λ of the exhaust gas. The vertical axis in FIG. 2 represents the conversion efficiency into $NH_3$ (i.e., the ratio between the amount of $NO_X$ converted into $NH_3$ by the three-way catalyst 5 and the total amount of $NO_X$ supplied to the three-way catalyst 5. As can be seen from FIG. 2, the conversion efficiency of $NO_X$ into $NH_3$ becomes almost constant in the region where the excess air ratio λ is low and decreases rapidly as λ becomes higher than 0.95 (as shown by the solid line in FIG. 2).

On the other hand, in the region λ<1.0, the amount of $NO_X$ produced by the No. 1 cylinder increases as the excess air ratio λ of the No. 1 cylinder becomes higher. Therefore, the amount of $NH_3$ produced by the three-way catalyst 5 increases as the excess air ratio λ of the No. 1 cylinder becomes higher in the region where λ<0.95, and reaches the maximum value at λ=0.95 as shown by the broken line in FIG. 2. When λ becomes higher than 0.95, the amount of $NH_3$ produced by the three-way catalyst 5 rapidly decreases as λ becomes higher due to a rapid fall in the conversion efficiency.

Therefore, when a three-way catalyst 5 is disposed in an exhaust gas passage of an internal combustion engine, the amount of $NH_3$ produced by the three-way catalyst becomes the maximum when the engine is operated at an excess air ratio λ=0.95. In this embodiment, the No. 1 cylinder is operated at an excess air ratio λ≈0.95 during the $NO_X$ spillage period to increase the amount of $NH_3$ supplied to the denitrating catalyst 7.

Further, when the amount of rhodium Rh contained in the three-way catalyst is large, the conversion efficiency of $NO_X$ into $NH_3$ becomes high. Further, precious metals such as palladium Pd have a good catalytic ability for oxidizing HC, CO and also show a relatively high conversion efficiency of $NO_X$ into $NH_3$. Since this embodiment uses $NH_3$ to reduce the $NO_X$ released from the $NO_X$ absorbent 3 during the $NO_X$ spillage period at the denitrating catalyst 7, the three-way catalyst 5 is required to produce a sufficient amount of $NH_3$ to reduce all the $NO_X$ released from the $NO_X$ absorbent during the $NO_x$ spillage period. Therefore, the three-way catalyst 5 in this embodiment contains a relatively large amount of rhodium Rh or other precious metal such as palladium Pd as the catalytic components to increase the conversion efficiency of $NO_x$ into $NH_3$.

Next, the denitrating catalyst 7 in this embodiment is explained.

The denitrating catalyst 7 in this embodiments uses, for example, a honeycomb type substrate made of cordierite, and an alumina layer which act as a carrier for the catalyst is coated on the cell surface of the honeycomb substrate. On this carrier, at least one substance selected from elements belong to the fourth period or the eighth group in the periodic table of elements, such as copper (Cu), chrome (Cr), vanadium (V), titanium (Ti), iron (Fe), nickel (Ni), cobalt (Co), platinum (Pt), palladium (Pd), rhodium (Rh) and iridium (Ir) is attached as a catalyst.

The denitrating catalyst is capable of converting all the $NH_3$ in the exhaust gas flowing into the denitrating catalyst to $N_2$ provided that the exhaust gas is in an oxidizing atmosphere ($\lambda > 1.0$) and the temperature of the catalyst is within a specific temperature range as determined by the substance being used as the catalyst. Namely, when the temperature of the denitrating catalyst 7 is in the specific temperature range and the exhaust gas flowing into the catalyst is an oxidizing atmosphere, the denitrating reactions $$8NH_3 + 6NO_2 \rightarrow 12H_2O + 7N_2$$

$$4NH_3 + 4NO + O_2 43 6H_2O + 4N_2$$

occur in the denitrating catalyst, in addition to the oxidizing reactions $$4NH_3 + 7O_2 \rightarrow 4NO_2 + 6H_2O$$

$$4NH_3 + 5O_2 \rightarrow 4NO + 6H_2O.$$

Due to these denitrating reactions, $NO_x$ produced by the oxidizing reactions is immediately converted into $N_2$. As a result of this sequential reaction, all of the $NH_3$ flowing into the denitrating catalyst 7 is converted into $N_2$ and $H_2O$.

Further, if the exhaust gas contains $NO_x$ in addition to $NH_3$, $NO_x$ is reduced by the above-explained denitrating reactions to $N_2$. In this case, if the amount of $NH_3$ in the exhaust gas is larger than the amount required to reduce all the $NO_x$ contained in the exhaust gas, surplus $NH_3$ is converted into $N_2$ by the above-explained sequential oxidizing and denitrating reactions and does not pass through the denitrating catalyst 7. Further, if HC and CO are contained in the exhaust gas in addition to $NH_3$, HC and CO are oxidized by the denitrating catalyst 7 and do not pass through the denitrating catalyst provided that the excess air ratio of the exhaust gas is larger than 1.0.

The specific temperature range explained above varies in accordance with the substance used as the catalyst. However, the specific temperature range of the denitrating catalyst is generally lower than the temperature range where other catalysts such as the three-way catalyst is used. For example, the specific temperature range is approximately 100° C.–400° C. when the substance such as platinum (Pt), palladium (Pd), rhodium (Rh) are used as the catalyst. More specifically, when platinum (Pt) is used, a temperature range 100° C.–300° C. is more preferable, and a temperature range 150° C. to 250° C. is most preferable. When palladium (Pd) and rhodium (Rh) are used, a temperature range 150° C.–400° C. is more preferable, and a temperature range 150° C. to 300° C. is most preferable. Further, when substances such as copper (Cu), chrome (Cr) and iron (Fe) are used, the specific temperature range is approximately 150° C.–650° C., and a temperature range 150° C.–500° C. is preferable.

In this embodiment, the length of the exhaust gas passages 141, 142 and 150 upstream of the denitrating catalyst 7 are determined in such a manner that the temperature of the exhaust gas flowing into the denitrating catalyst 7 is within the specific temperature (alternatively, positive cooling means such as cooling fins or a water cooling jacket may be provided on the wall of the exhaust gas passages to adjust the temperature of the exhaust gas).

In this embodiment, the cylinders No. 2 to No. 4 are operated at an excess air ratio $\lambda > 1.0$ (a rich air-fuel ratio) during the regenerating operation of the $NO_x$ absorbent 3. Since the amount of $NO_x$ spillage is larger as the excess air ratio of the exhaust gas during the regenerating operation is higher, the cylinders No. 2 to No. 4 are operated at a considerably rich air-fuel ratio (for example, $\lambda = 0.8$–$0.9$) during the regenerating operation. However, since HC and CO in the exhaust gas are all oxidized by the $NO_x$ released from the $NO_x$ absorbent, the excess air ratio of the exhaust gas downstream of the $NO_x$ absorbent 3 becomes near the stoichiometric ($\lambda = 1.0$). On the other hand, the No. 1 cylinder is operated at a slightly rich air-fuel ratio ($\lambda = 0.95$) during the $NO_x$ spillage period. Therefore, the excess air ratio of the exhaust gas supplied to the denitrating catalyst 7, which is the mixture of the exhaust gases flowing through the exhaust gas passages 141 and 142, becomes slightly rich compared to the stoichiometric air-fuel ratio during the $NO_x$ spillage period.

As explained before, in order to purify both $NO_x$ and $NH_3$ at the denitrating catalyst 7, it is required that the excess air ratio of the exhaust gas flowing into the denitrating catalyst is larger than 1.0 (i.e., a lean air-fuel ratio). Therefore, secondary air is supplied from the nozzle 81 to the common exhaust gas passage 150 upstream of the denitrating catalyst 7 during the $NO_x$ spillage period to make the excess air ratio of the exhaust gas flowing into the denitrating catalyst higher than 1.0.

The amount of the secondary air supplied to the denitrating catalyst 7 is controlled by the control valve 82. However, since the denitrating catalyst 7 in this embodiment is capable of purifying both $NH_3$ and $NO_x$ regardless of the excess air ratio $\lambda$ of the exhaust gas provided that $\lambda > 1.0$, a strict control of the amount of the secondary air in not required. Therefore, the amount of the secondary air during the $NO_x$ spillage period in this embodiment is set at as large as possible within the range which can maintain the $NO_x$ absorbent 3 in the specific temperature range explained before in order to ensure that the excess air ratio of the exhaust gas flowing into the denitrating catalyst is larger than 1.0.

Next, the exhaust gas purifying operation of the device in FIG. 1 is explained with reference to FIG. 3.

Figure 3:
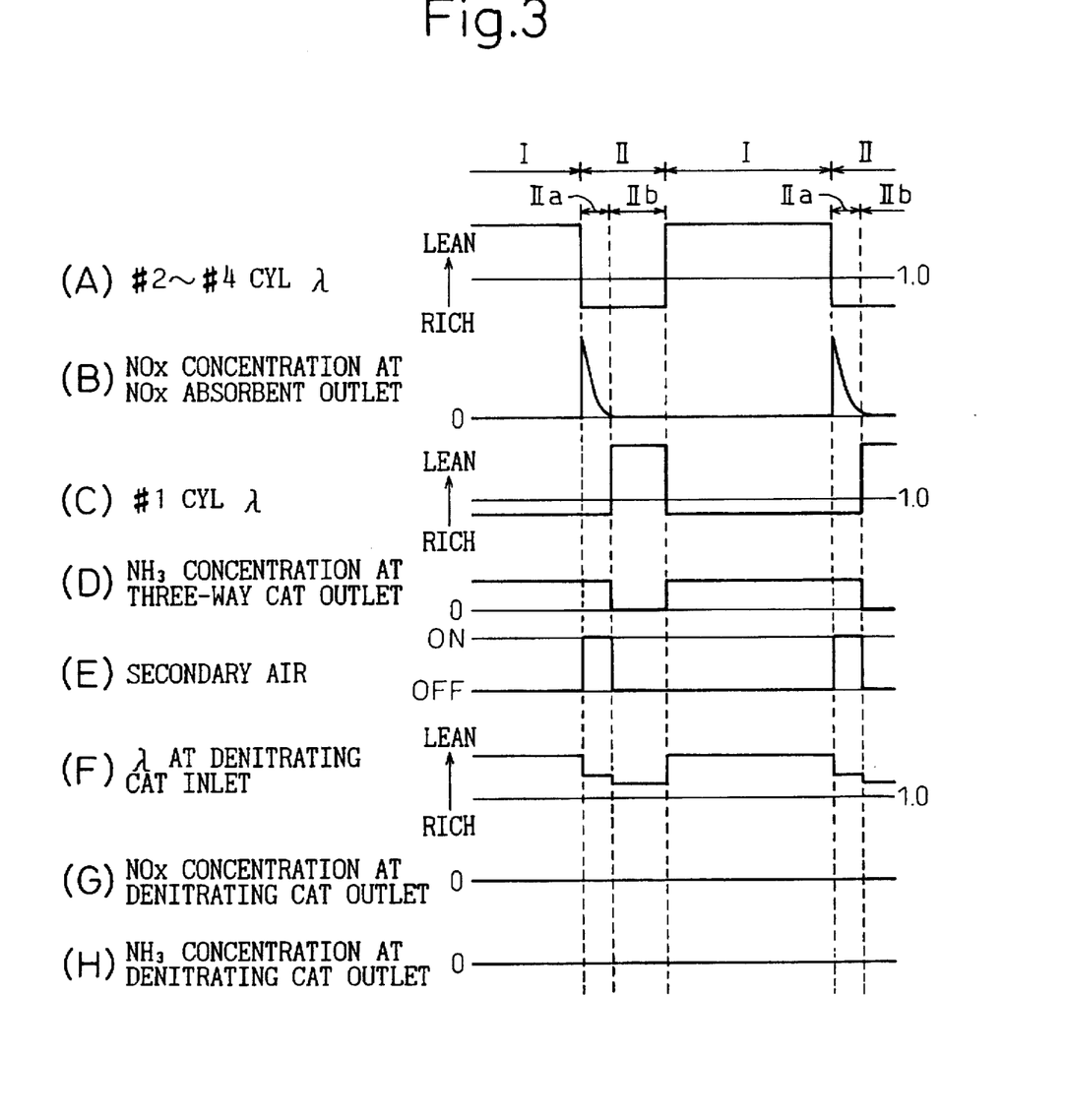

FIG. 3 is a timing diagram showing the exhaust gas purifying operation of the device in FIG. 1. In FIG. 1, the section I represents the period in which the $NO_x$ absorbent 3 absorbs $NO_x$ in the exhaust gas, and section II represents the period for the regenerating operation of the $NO_x$ absorbent 3. Further, section IIa represents the $NO_x$ spillage period, and section IIb represents the period of regenerating operation after the $NO_x$ spillage ends. In FIG. 3, the curve (A) shows the excess air ratio $\lambda$ of No. 2 to No. 4 cylinders, (B) shows the concentration of $NO_x$ in the exhaust gas at the outlet of the $NO_x$ absorbent 3. As seen from the curve (A), No. 2 to No. 4 cylinders are operated at an excess air ratio $\lambda > 1.0$ (a lean air-fuel ratio) in the section I. Since almost all of the $NO_x$ in the exhaust gas is absorbed by the $NO_x$ absorbent 3 in this condition, the concentration of $NO_x$ in the exhaust gas at the outlet of the $NO_x$ absorbent 3 is negligible (the curve (B)).

When the regenerating operation of the $NO_x$ absorbent 3 starts at section II, the excess air ratio of the No. 2 to No. 4 cylinders are switched to the value lower than 1.0, for example, the excess air ratio of No. 2 to No. 4 cylinders are set at around $\lambda=0.8-0.9$ in order to suppress the $NO_x$ spillage from the $NO_x$ absorbent 3. Therefore, an exhaust gas containing a low concentration of oxygen and a relatively high concentration of HC and CO flows into the $NO_x$ absorbent 3 when the regenerating operation starts. Though the $NO_x$ spillage can be suppressed to some extent by setting the excess air ratio of the exhaust gas to be low, it cannot be suppressed completely. Therefore, as shown by the curve (B) at the section IIa, the concentration of $NO_x$ in the exhaust gas at the outlet of the $NO_x$ absorbent 3 temporarily increases due to $NO_x$ spillage. After the $NO_x$ spillage period lapses (the section IIa in the curve (B)), since the rate of $NO_x$ releasing becomes low and all of the $NO_x$ released from the $NO_x$ absorbent is reduced by HC, CO in the exhaust gas, the concentration of $NO_x$ in the exhaust gas at the outlet of the $NO_x$ absorbent 3 returns to a negligible value. Further, as explained before, the excess air ratio of the exhaust gas at the outlet of the $NO_x$ absorbent 3 in this condition becomes approximately 1.0 (a stoichiometric air-fuel ratio). After a predetermined regenerating operation period (the section II in FIG. 3) lapses, the excess air ratio of No. 2 to No. 4 cylinders is switched to a value higher than 1.0 (a lean air-fuel ratio), and the $NO_x$ absorbent 3 again starts to absorb $NO_x$ in the exhaust gas.

The curve (C) in FIG. 3 shows the excess air ratio of the No. 1 cylinder.

In this embodiment, the No. 1 cylinder is operated at an excess air ratio slightly lower than 1.0, i.e., at an air-fuel ratio slightly rich compared to the stoichiometric air-fuel ratio during the $NO_x$ absorbing period of the $NO_x$ absorbent 3 (section I in FIG. 3). The excess air ratio of the No. 1 cylinder during this period is set at a value $\lambda=0.95$ at which a maximum amount of $NH_3$ is produced by the three-way catalyst 5. Further, operation of the No. 1 cylinder at this excess air ratio ($\lambda=0.95$) is continued until the $NO_x$ spillage period ends (section IIa in FIG. 3). When the $NO_x$ spillage period ends, the air-fuel ratio of No. 1 cylinder is switched to a lean air-fuel ratio or a stoichiometric air-fuel ratio ($\lambda\geq1.0$). As seen from the curve (C) in FIG. 3 at the section IIb, the excess air ratio of the No. 1 cylinder in this embodiment is switched to a value $\lambda>1.0$ (a lean air-fuel ratio). After the regenerating operation period lapses, the excess air ratio of the No. 1 cylinder is returned to a value slightly lower than 1.0.

The curve (D) in FIG. 3 shows the concentration of $NH_3$ in the exhaust gas at the outlet of the three-way catalyst 5. As seen from the curve (D), during the $NO_x$ absorbing period (the section I) and the $NO_x$ spillage period (the section IIa), the concentration of $NH_3$ in the exhaust gas at the outlet of the three-way catalyst 5 becomes relatively high due to decrease in the excess air ratio of the exhaust gas. Further, though not shown in FIG. 3, the concentration of HC and CO in the exhaust gas at the outlet of the three-way catalyst 5 also becomes high since the conversion efficiency of HC and CO by the three-way catalyst 5 becomes low when the excess air ratio is low.

The curve (E) in FIG. 3 shows the supply of the secondary air from the nozzle 81. As seen from the curve (E), secondary air is supplied only during the $NO_x$ spillage period (the section IIa) at the beginning of the regenerating operation (the section II) of the $NO_x$ absorbent 3.

The curve (F) shows the excess air ratio of the exhaust gas in the common exhaust gas passage 150 upstream of the denitrating catalyst 7 where the exhaust gas from No. 1 cylinder and the exhaust gas from No. 2 to No. 4 cylinders are mixed with each other.

In the $NO_x$ absorbing period (the section I), the exhaust gas having slightly rich air-fuel ratio and containing a relatively large amount of $NH_3$ and HC, CO flows into the common exhaust gas passage 150 from the exhaust gas passage 141. However, since the exhaust gas having a lean air-fuel ratio and containing a very small amount of $NO_x$ flows into the common exhaust gas passage 150 from the exhaust gas passage 141, the air-fuel ratio of the exhaust gas at the inlet of the denitrating catalyst 7 becomes lean as a whole. Further, though this exhaust gas contains $NH_3$, HC and CO, it does not contain $NO_x$, as seen from the curve (F) in FIG. 3. Therefore, $NH_3$, HC and CO in the exhaust gas flowing into the denitrating catalyst 7 during the $NO_x$ absorbing period (the section I) are completely purified by the denitrating catalyst 7. Thus, the concentrations of $NH_3$, HC and CO in the exhaust gas leaving the denitrating catalyst become negligible.

On the other hand, during the $NO_x$ spillage period (the section IIa) at the beginning of the regenerating operation, exhaust gas containing a relatively large amount of $NO_x$ and having an air-fuel ratio near the stoichiometric air-fuel ratio flows into the common exhaust gas passage 150 from the second exhaust gas passage 142. Further, the exhaust gas containing $NH_3$ and having a slightly rich air-fuel ratio flows into the common exhaust gas passage 150 from the first exhaust gas passage 141. Therefore, the air-fuel ratio of the mixture of these exhaust gases becomes slightly rich compared to the stoichiometric air-fuel ratio. However, since the secondary air is supplied to the common exhaust gas passage 150 during this period (the curve (E) at the section IIA), the excess air ratio of the exhaust gas flowing into the denitrating catalyst 7 is maintained at the value $\lambda>1.0$. Therefore, $NO_x$ in the exhaust gas reacts with $NH_3$ and is reduced at the denitrating catalyst 7. Further, since HC and CO as well as surplus $NH_3$ in the exhaust gas are purified by the denitrating catalyst 7 under an oxidizing atmosphere, the exhaust gas at the outlet of the denitrating catalyst 7 is substantially free from $NO_x$ and $NH_3$ even in the $NO_x$ spillage period as shown by the curves (G) and (H) at the section IIa. Namely, $NO_x$ released from the $NO_x$ absorbent 3 due to $NO_x$ spillage at the beginning of the regenerating operation is completely purified by the denitrating catalyst 7.

Further, when the $NO_x$ spillage from the $NO_x$ absorbent 3 completes, the concentration of $NO_x$ in the exhaust gas at the outlet of the $NO_x$ absorbent 3 becomes negligible, and the excess air ratio of the exhaust gas becomes almost 1.0 (a stoichiometric air-fuel ratio) in the period IIb in FIG. 3 (the curve (B)). During this period, since No. 1 cylinder is operated at an excess air ratio larger than 1.0 (a lean air-fuel ratio) (the curve (C)), the air-fuel ratio of the exhaust gas in the common exhaust gas passage 150 upstream of the denitrating catalyst 7 becomes lean even though the supply of the secondary air is stopped (the curves (E) and (F)). Therefore, if the surplus HC and CO which are not used for reducing $NH_3$ at the $NO_x$ absorbent 3 are contained in the exhaust gas leaving the $NO_x$ absorbent 3, the surplus HC and CO are oxidized and purified at the denitrating catalyst 7.

Figure 4:
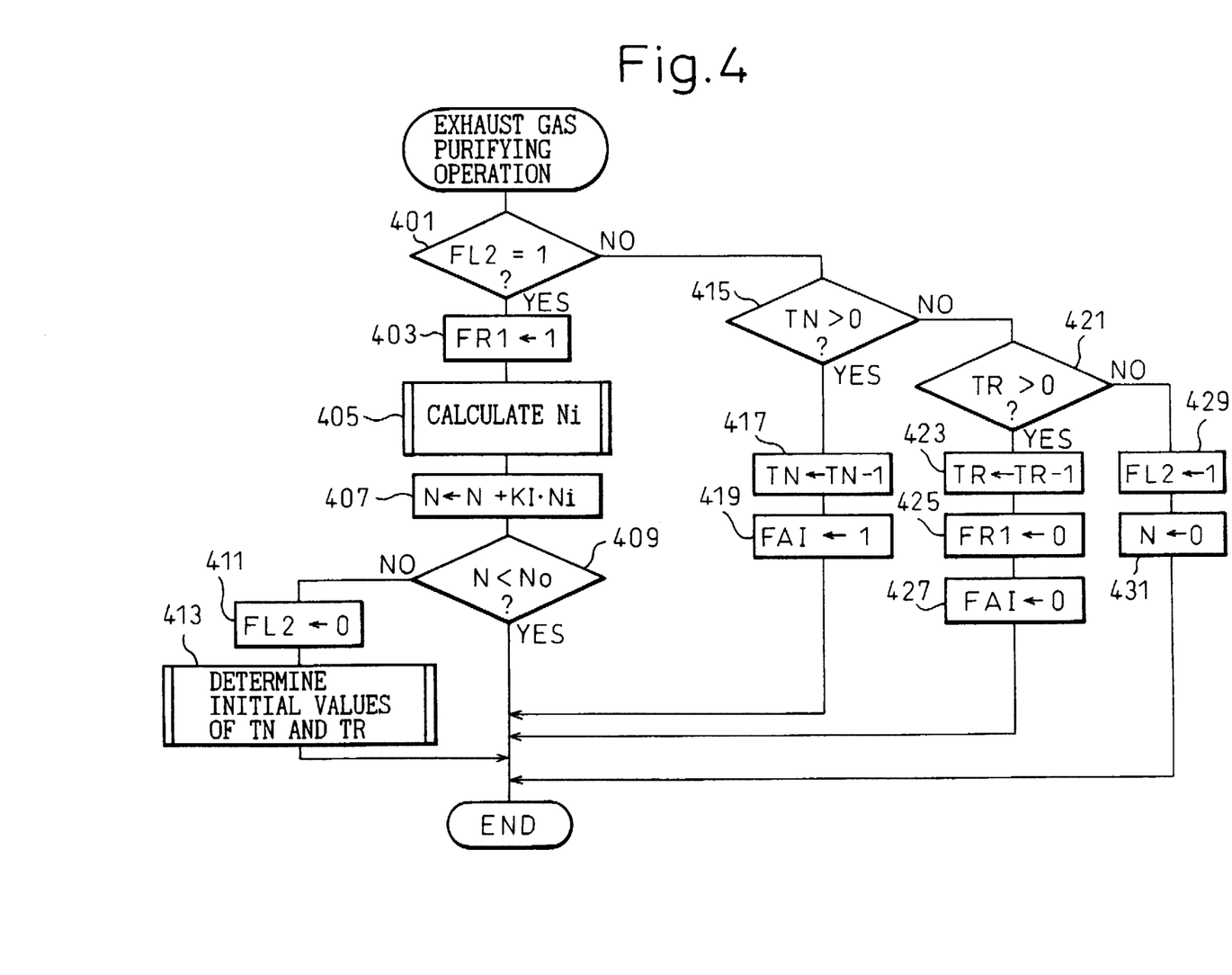
FIG. 4 is a flowchart explaining an exhaust gas purifying operation of the device in FIG. 1.

Next, the air-fuel ratio control of No. 1 to No. 4 cylinders required for the exhaust gas purifying operation in FIG. 3 is explained. FIG. 4 is a flowchart explaining the air-fuel ratio control of No. 1 and No. 2 to No. 4 cylinders. This routine is performed by the ECU 30 at predetermined intervals.

In FIG. 4, at step 401, it is determined whether a lean air-fuel ratio operation flag FL2 is set at 1. FL2 is a flag set at steps 411 and 429 and FL2=1 represents that No. 2 to No. 4 cylinders are operated at a lean air-fuel ratio at present.

In this embodiment, the ECU 30 calculates the fuel injection amount TAU2 of No. 2 to No. 4 cylinders by a not shown routine at predetermined intervals based on the following formula.

$$TAU2=TAUP/\lambda_T$$

TAUP is a basic fuel injection amount which is the fuel amount required to maintain the air-fuel ratio of the air-fuel mixture supplied to the cylinders at the stoichiometric air-fuel ratio ($\lambda$=1.0). The basic fuel injection amount TAUP is determined in accordance with the load condition of the engine. For example, TAUP is calculated based on the amount of intake air per one revolution of the engine Q/NE by TAUP=K×Q/NE (K is a constant). $\lambda_T$ is a target excess air ratio of the cylinders. In this embodiment, when the flag FL2 is set at 1, the target excess air ratio $\lambda_T$ is set at a value $\lambda_L$ for a lean air-fuel ratio operation (for example, $\lambda_L$=1.3–1.4). Namely, when $\lambda_T$ is set at $\lambda_L$, the No. 2 to No. 4 cylinders are operated at a lean air-fuel ratio and the $NO_x$ absorbent 3 absorbs $NO_x$ in the exhaust gas. Further, when the lean air-fuel ratio operation flag FL2 is set at 0, the target excess air ratio $\lambda_T$ is set at a value $\lambda_R$ for a rich air-fuel ratio operation (for example, $\lambda_R$=0.8–0.9). Therefore, when $\lambda_T$ is set at a value $\lambda_R$, the No. 2 to No. 4 cylinders are operated at a rich air-fuel ratio and the $NO_x$ absorbent 3 releases the absorbed $NO_x$.

If FL2=1 at step 401, i.e., if the $NO_x$ absorbent 3 is performing the $NO_x$ absorbing operation, the routine executes step 403 to set the value of a flag FR1 at 1. RF1 is a rich air-fuel ratio operation flag set at steps 403 and 425 and FR1=1 represents that the No. 1 cylinder is operated at a rich air-fuel ratio at present.

Similarly to the calculation for the fuel injection amount TAU2, the ECU 30 calculates the fuel injection amount TAU1 of the No. 1 cylinder by TAU1=TAUP/$\lambda_T$ in this embodiment. However, in this case, the target air-fuel ratio $\lambda_T$ is set at a value $\lambda_R$ corresponding to a slightly rich air-fuel ratio (in this case, $\lambda_R$≈0.95) when the flag RF1 is set at 1. Therefore, when the rich air-fuel ratio operation flag FR1 is set at 1, the No. 1 cylinder is operated at a slightly rich air-fuel ratio to maximize the amount of $NH_3$ produced at the three-way catalyst 5. Further, when the rich air-fuel ratio operation flag FR1 is set at 0, the target excess air ratio $\lambda_T$ is set at a value $\lambda_L$ corresponding a lean air-fuel ratio (for example, $\lambda_L$≈1.3–1.4) and the No. 1 cylinder is operated at a lean air-fuel ratio.

Figure 5:
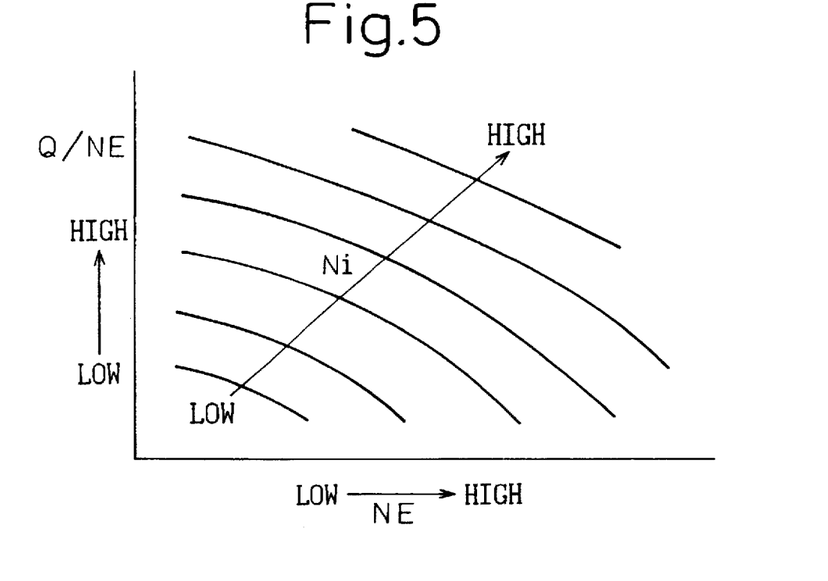
FIG. 5 is a graph showing the change in the amount of $NO_x$ generated by an engine in accordance with the changes in the engine operating conditions.

Then, at step 405, the amount $N_i$ of $NO_x$ produced by the No. 2 to No. 4 cylinders per unit time during the lean air-fuel ratio operation is calculated. FIG. 5 shows the change in the amount $N_i$ in accordance with the changes in the engine load (Q/NE) and the engine speed (NE) when the engine is operated at a constant air-fuel ratio. The respective curves in FIG. 5 represent constant $N_i$ lines. Namely, the amount $N_i$ of $NO_x$ produced by the engine per unit time increases as the engine speed NE becomes high (i.e., as the engine intake air amount becomes large) provided that the engine load (Q/NE) is the same, and increases as the engine load (Q/NE) becomes high (i.e., the combustion temperature becomes high) provided that the engine speed NE is the same.

In this embodiment, the values of $N_i$ were measured by operating an actual engine at $\lambda_T$=$\lambda_L$ in various engine load and speed conditions, and the measured value of $N_i$ is stored in the ROM of the ECU 30 in the form of a numerical table based on Q/NE and NE. At step 405, the value $N_i$ is determined from this numerical table using actual values of Q/NE and NE.

At step 407, a value N is calculated by cumulating the value $N_i$ multiplied by a constant KI. KI is a constant determined by the interval of the execution of the routine and corresponds to the amount of $NO_x$ absorbed by the $NO_x$ absorbent 3 during the interval. Therefore, the cumulative value N represents the total amount of $NO_x$ held in the $NO_x$ absorbent 3.

In this embodiment, the amount of $NO_x$ absorbed by the $NO_x$ absorbent 3 during the lean air-fuel ratio operation of the No. 2 to No. 4 cylinders (FL2=1) is calculated as N at step 407, and the regenerating operation of the $NO_x$ absorbent 3 is performed when the amount N of $NO_x$ absorbed by the $NO_x$ absorbent 3 reaches a predetermined value $N_0$ in order to prevent the $NO_x$ absorbent 3 from being saturated with absorbed $NO_x$.

Namely, at step 409, the routine determines whether the amount N calculated at step 407 reaches a predetermined value $N_0$, and if N<$N_0$ at step 409, i.e., if the amount of $NO_x$ held in the $NO_x$ absorbent 3 is small, the routine terminates immediately. In this case, since steps 401 through 409 are executed when the routine is performed next, the $NO_x$ absorbing operation of the $NO_x$ absorbent 3 continues. If N≥$N_0$ at step 409, since this means that the amount of $NO_x$ absorbed by the $NO_x$ absorbent 3 has become large, and that the regenerating operation is required, the routine executes step 411 to set the value of the lean air-fuel ratio operation flag FL2 of the No. 2 to No. 4 cylinders at 0. When the value of the flag FL2 is set at 0, No. 2 to No. 4 cylinders are operated at a rich air-fuel ratio to start the regenerating operation of the $NO_x$ absorbent 3. The threshold value No in this embodiment, is set at, for example, about 70% of the maximum amount of $NO_x$ can be held by the $NO_x$ absorbent 3.

Step 413 is a step for setting initial values of a $NO_x$ spillage period counter TN and a regenerating operation period counter TR. As explained later, the initial value of the counter TN is set at a value corresponding to the length of the time period in which $NO_x$ spillage continues (i.e., the period IIa in FIG. 3), and the initial value of the counter TR is set at a value corresponding to the length of the time period in which the regenerating operation is continued after the $NO_x$ spillage ends (i.e., the period IIb in FIG. 3).

Since the time required for the $NO_x$ spillage and the regenerating operation to complete are varied in accordance with the temperature of the $NO_x$ absorbent 3, the initial values of TN and TR are determined in accordance with the temperature of the $NO_x$ absorbent 3 in this embodiment. The temperature of the $NO_x$ absorbent 3 may be directly measured by disposing a temperature sensor in the $NO_x$ absorbent 3. However, the temperature of the $NO_x$ absorbent 3 is estimated based on the engine load (i.e., the exhaust gas temperature) and the engine speed (i.e., the flow rate of the exhaust gas) in this embodiment. Namely, in this embodiment, the times required for completing the $NO_x$ spillage and the regenerating operation were measured by operating an actual engine at various engine load (Q/NE) and speed (NE) conditions, and the measured times TN and TR are stored in the ROM of the ECU 30 in the form of numerical tables based on Q/NE and NE. At step 413, the initial values of TN and TR are determined from this numerical table using actual values of Q/NE and NE.

When the initial values of TN and TR are set at step 413, step 415 is executed after step 401 when the routine is next executed. At step 415, the routine determines whether the value of the $NO_x$ spillage counter TN is larger than 0. If TN>0, since this means that the $NO_x$ spillage is not completed, the routine proceeds to step 417 to decrease the value of the counter TN by 1, and to step 419 to set the value of the secondary air supply flag FAI to 1. When the value of the flag FAI is set to 1, the control value 82 is opened to a predetermined degree of opening by another routine (not shown) executed by the ECU 30, and secondary air is supplied to the denitrating catalyst 7. By executing these steps, the rich air-fuel ratio operation of No. 1 cylinder continues until the value of the counter TN decreases to a negative value (step 415) even after the air-fuel ratio of No. 2 to No. 4 cylinders is switched to a rich air-fuel ratio, and secondary air is supplied to denitrating catalyst 7. Therefore, the exhaust gas having a lean air-fuel ratio and containing $NH_3$ and $NO_x$ flows into the denitrating catalyst 7, and $NO_x$ in the exhaust gas is reduced by $NH_3$.

When TN≦0 at step 415, i.e., if it is determined that the $NO_x$ spillage from the $NO_x$ absorbent 3 is complete, the routine proceeds to step 421 to determine whether the value of the regenerating operation period counter TR is larger than 0. If TR>0 at step 421, this means that, although the $NO_x$ spillage has ended, the time required for the regenerating operation has not lapsed. Therefore, in this case, the routine proceeds to step 423 to decrease the value of the regenerating operation period counter TR by 1. Then, the routine sets the value of the No. 1 cylinder rich air-fuel ratio operation flag FR1 to 0 at step 425, and sets the value of the secondary air flag FAI to 0 at step 427. Therefore, the supply of secondary air is stopped during the regenerating operation after the $NO_x$ spillage has completed. Namely, as seen from FIG. 3, section IIb, until the value of the counter TR decreases to a negative value, the No. 1 cylinder is operated at a lean air-fuel ratio and the No. 2 to No. 4 cylinders are operated at a rich air-fuel ratio, and the supply of the secondary air is stopped.

If TR≦0 at step 421, i.e., if the time required for the regenerating operation has lapsed, the routine executes steps 429 and 431 to set the value of the flag FL2 to 1, and to set the $NO_x$ amount N held by the $NO_x$ absorbent 3 to 0. By performing these steps, the air-fuel ratio of No. 2 to No. 4 cylinders is switched to a lean air-fuel ratio (step 403), and a new calculation of the $NO_x$ amount N starts (steps 405, 407) when the routine is next executed. Steps 403 to 409 in FIG. 4 correspond to the section I in FIG. 3, and steps 415 to 419 and steps 421 to 427 correspond to the sections IIa and IIb, respectively.

By performing the routine in FIG. 4, $NO_x$ released by the $NO_x$ spillage of the $NO_x$ absorbent 3 at the beginning of the regenerating operation thereof react with, and is reduced by, $NH_3$ produced by the three-way catalyst 5 at the denitrating catalyst 7. Therefore, the diffusion of $NO_x$ into the atmosphere is prevented.

Although the counters TN and TR are used for determining whether the $NO_x$ spillage and the regeneration of the $NO_x$ absorbent 3 has completed, the completion of the $NO_x$ spillage and the regeneration of the $NO_x$ absorbent 3 can be determined directly without using the counters TN and TR.

For example, the concentration of $NO_x$ in the exhaust gas at the outlet of the $NO_x$ absorbent increases during the $NO_x$ spillage period and decreases to nearly zero when the $NO_x$ spillage has completed (FIG. 3, the curve (B)). Therefore, the completion of the $NO_x$ spillage can be determined by monitoring the $NO_x$ concentration in the exhaust gas at the outlet of the $NO_x$ absorbent 3 by disposing a $NO_x$ sensor at the outlet of the $NO_x$ absorbent 3. Further, as explained before, the air-fuel ratio of the exhaust gas at the outlet of the $NO_x$ absorbent 3 becomes the stoichiometric air-fuel ratio during the regenerating operation even though the air-fuel ratio of the exhaust gas flowing into the $NO_x$ absorbent is a rich air-fuel ratio. However, when the regeneration of the $NO_x$ absorbent is completed, i.e., when the releasing of $NO_x$ from the absorbent has stopped, the air-fuel ratio of the exhaust gas at the outlet of the $NO_x$ absorbent becomes a rich air-fuel ratio the same as that of the exhaust gas at the inlet of the $NO_x$ absorbent. Therefore, the completion of the regeneration of the $NO_x$ absorbent 3 can be determined by monitoring the air-fuel ratio of the exhaust gas by an air-fuel ratio sensor disposed on the exhaust gas passage downstream of the $NO_x$ absorbent 3. In this case, when the air-fuel ratio of the exhaust gas at the outlet of the $NO_x$ absorbent 3 changes from the stoichiometric air-fuel ratio to a rich air-fuel ratio during the regenerating operation, it can be determined that the regeneration of the $NO_x$ absorbent 3 has completed.

Next, another embodiment of the present invention is explained.

Figure 6:
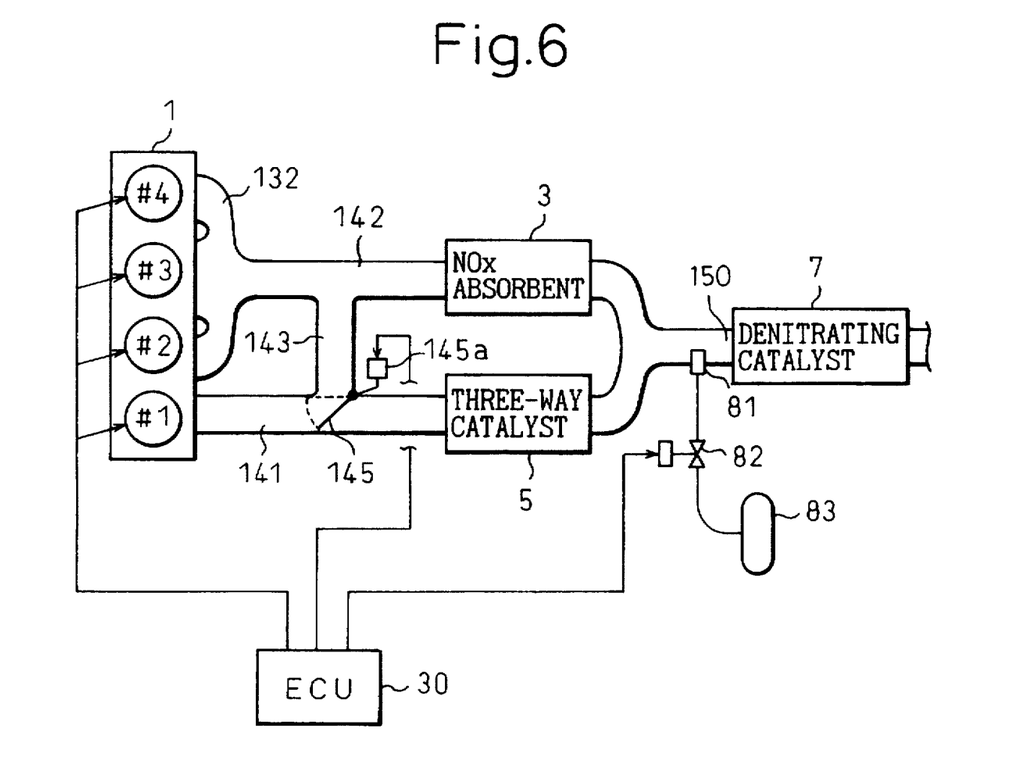
FIG. 6 schematically illustrates another embodiment of the exhaust gas purification device according to the present invention.

FIG. 6 shows a general configuration of another embodiment of the present invention when it is applied to a vehicle engine. In FIG. 6, reference numerals the same as those in FIG. 1 represent the same elements.

In this embodiment, a third exhaust gas passage 143, which connects the first exhaust gas passage 141 and the second exhaust gas passage 142 is provided. Further, in FIG. 6, a switching valve 145 which is capable of directing the exhaust gas from No. 1 cylinder to either of the $NO_x$ absorbent 3 on the second exhaust gas passage 142 and the three-way catalyst 5 on the first exhaust gas passage is provided. The switching valve 145 is provided with an actuator 145a which actuates the valve 145 in response to a control signal from the ECU 30. When the actuator 145a moves the switching valve 145 to the position indicated by the solid line in FIG. 6, all the exhaust gas from No. 1 cylinder flows into the $NO_x$ absorbent 3 through the third exhaust gas passage 143 and, when the actuator 145 moves the valve 145 to the position indicated by the broken line in FIG. 6, the exhaust gas from No. 1 cylinder flows into the three-way catalyst 5.

Next, the exhaust gas purifying operation of the device in FIG. 6 is explained with reference to FIG. 7.

Figure 7:
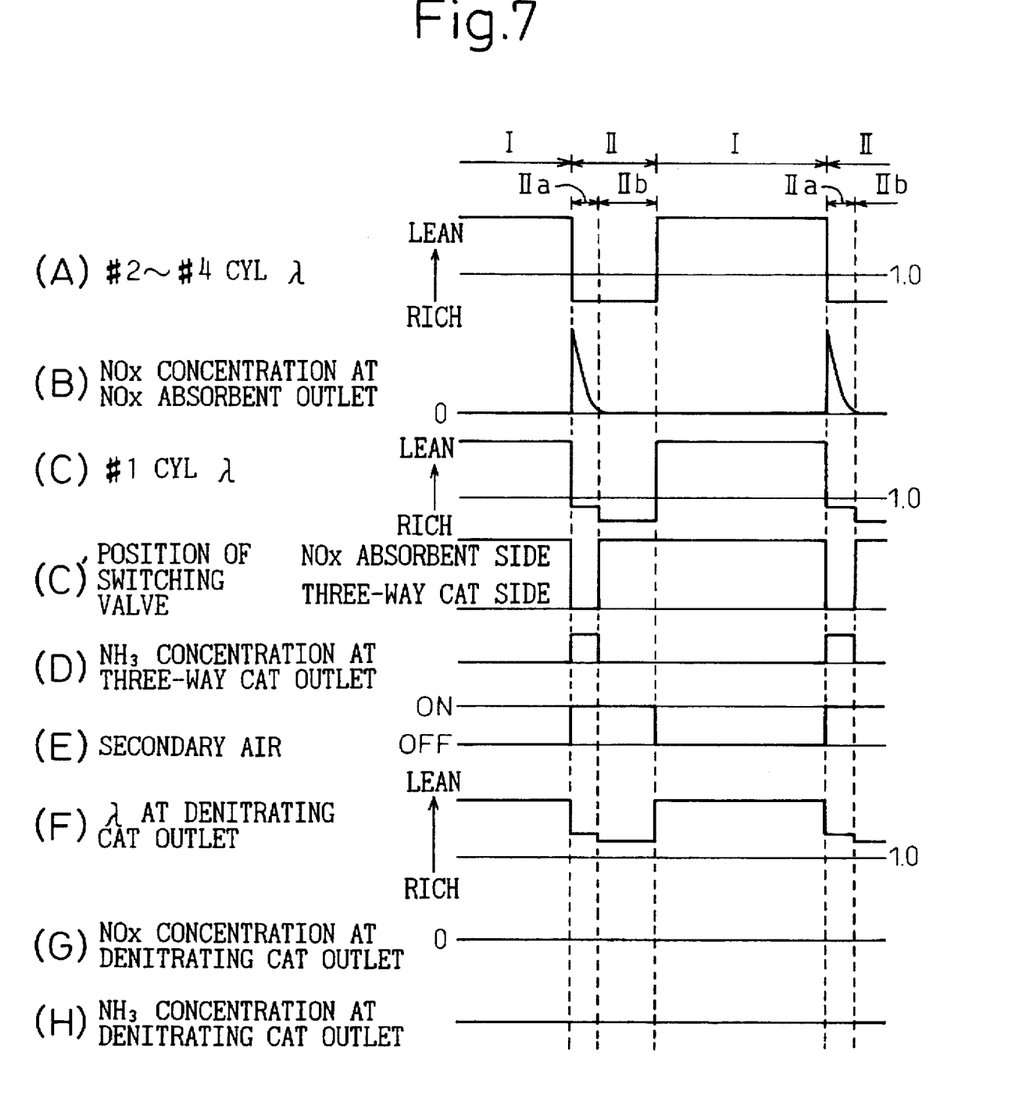

FIG. 7 is a timing diagram similar to FIG. 3, except that the curve (c)' which indicates the position of the switching valve 145 is added.

In this embodiment, when the $NO_x$ absorbent 3 absorbs $NO_x$ in the exhaust gas, i.e., when the No. 2 to No. 4 cylinders are operated at a lean air-fuel ratio (the section I in FIG. 7), the No. 1 cylinder is also operated at a lean air-fuel ratio (the curve (c) in FIG. 7), and the switching valve 145 is set to the position where the exhaust gas from the No. 1 cylinder is directed to the third exhaust gas passage 143 (i.e., the position indicated by the solid line in FIG. 6) (the curve (c)' in FIG. 7). Therefore, in this case, the lean air-fuel ratio exhaust gas from the No. 1 cylinder also flows into the $NO_x$ absorbent 3. Further, the No. 1 cylinder is operated at a slightly rich air-fuel ratio (λ=0.95) and the switching valve 145 is set to the position where the exhaust gas from the No. 1 cylinder is directed to the three-way catalyst 5 (i.e., the position indicated by the broken line in FIG. 6) during the $NO_x$ spillage period (the section IIa in FIG. 7). Therefore, a slightly rich air-fuel ratio exhaust gas is supplied to the three-way catalyst 5 and $NH_3$ is produced at three-way catalyst 5 (the curves (C)' and (D) in FIG. 7). Thus, the $NO_x$ released from the $NO_x$ absorbent 3 during the $NO_x$ spillage period is also reduced by $NH_3$ produced by three-way catalyst 5 at the denitrating catalyst 7 in this embodiment.

Further, when the $NO_x$ spillage completes, the switching valve 145 is immediately switched to the position where the exhaust gas from No. 1 cylinder is directed to the third exhaust gas passage 143, and the air-fuel ratio of No. 1 cylinder is switched to the rich air-fuel ratio the same as that of No. 2 to No. 4 cylinders ($\lambda \approx 0.8$–0.9). Thus, the rich air-fuel ratio exhaust gas from No. 1 cylinder in addition to the exhaust gas from No. 2 to No. 4 cylinders flows into the $NO_x$ absorbent 3 during the regenerating operation of $NO_x$ absorbent 3 after the $NO_x$ spillage has completed (the section IIb in FIG. 7). In this embodiment, since the secondary air is supplied to the denitrating catalyst 7 during all the regenerating operation period (the curve (E) in FIG. 7), the air-fuel ratio of the exhaust gas flowing into the denitrating catalyst 7 is controlled at a lean air-fuel ratio even in the regenerating operation period. However, as explained before, since the air-fuel ratio of the exhaust gas flows out from the $NO_x$ absorbent 3 during the regenerating operation period is the stoichiometric air-fuel ratio, supply of the secondary air to the denitrating catalyst may not be required during the regenerating operation period after the $NO_x$ spillage has completed (the section IIb in FIG. 7). In this case, since the air-fuel ratio of the exhaust gas flowing into the denitrating catalyst 7 becomes the stoichiometric air-fuel ratio, HC, CO in the exhaust gas can be oxidized and purified by the denitrating catalyst 7 without supplying the secondary air.

In this embodiment, by directing the exhaust gas from the No. 1 cylinder to the $NO_x$ absorbent 3 during the $NO_x$ absorbing period (the section I in FIG. 7) by means of the switching valve 145, the No. 1 cylinder can be operated at a lean air-fuel ratio during most of the engine operation period. Therefore, when compared to the embodiment in FIG. 1, a fuel consumption of the engine is largely improved.

Figure 8:
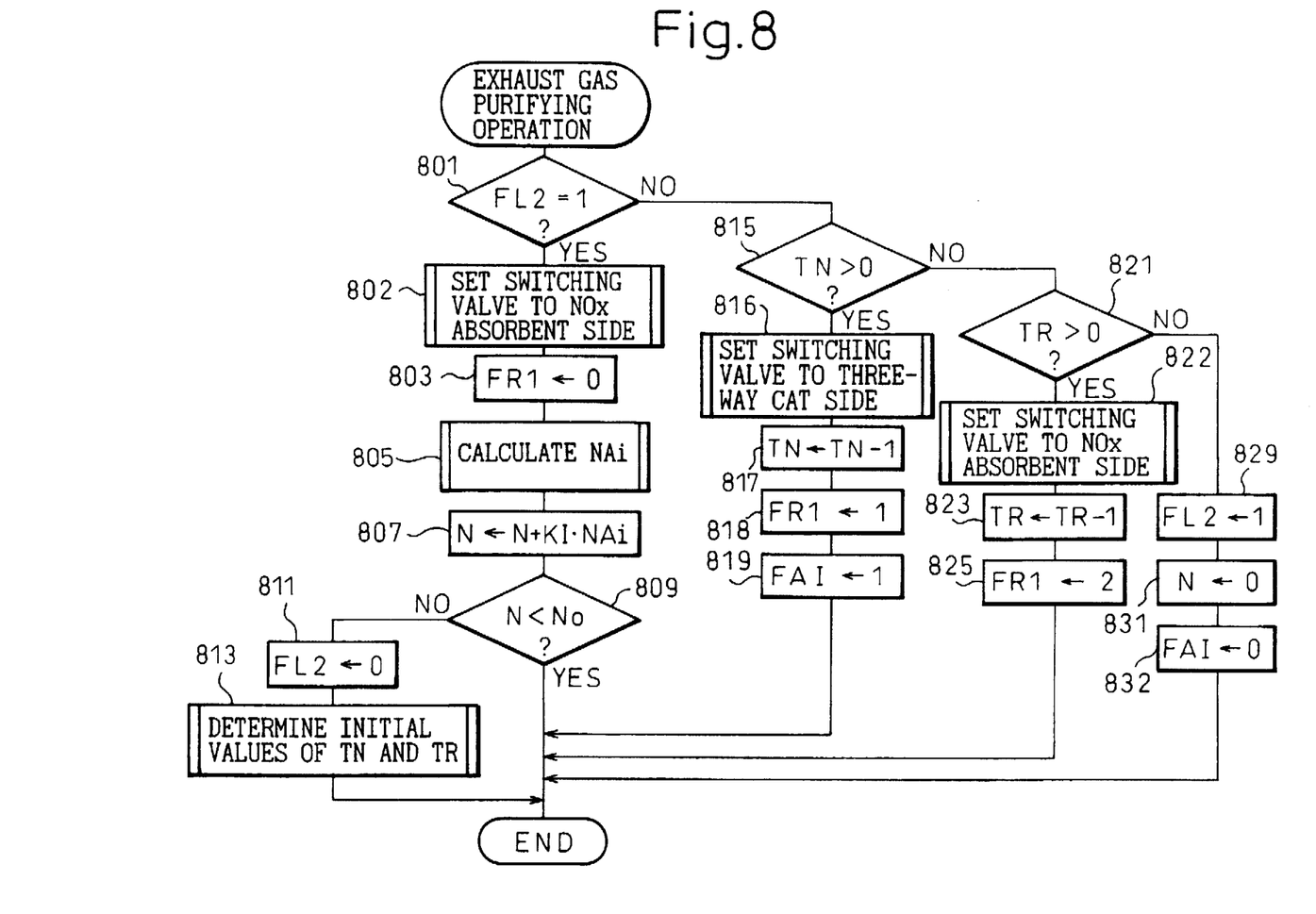
FIG. 8 is a flowchart explaining an exhaust gas purifying operation of the device in FIG. 6.

Next, the air-fuel ratio control of the respective cylinders required for the exhaust gas purifying operation in FIG. 7 is explained with reference to FIG. 8. FIG. 8 is a flowchart explaining the air-fuel ratio control of No. 1 and No. 2 to No. 4 cylinders in this embodiment. This routine is performed by the ECU 30 at predetermined intervals.

In FIG. 8, at step 801, it is determined whether the value of the lean air-fuel ratio operation flag FL2 is set at 1. FL2 is a flag representing the lean air-fuel ratio operation of No. 2 to No. 4 cylinders and has the function the same as FL2 in FIG. 4. Namely, when the value of FL2 is set at 1, No. 2 to No. 4 cylinders are operated at a lean air-fuel ratio such as $\lambda \approx 1.3$–1.4 and, when the value of FL2 is set at 0, No. 2 to No. 4 cylinders are operated at a rich air-fuel ratio such as $\lambda \approx 0.8$–0.9.

When FL2=1 at step 801, i.e., when the $NO_x$ absorbing operation of the $NO_x$ absorbent 3 is being performed, the routine sets the switching valve 145 to the position where the exhaust gas from No. 1 cylinder is directed to the $NO_x$ absorbent 3 at step 802 and set the value of the flag FR1 to 0 at step 803. The flag FR1 represents the operating air-fuel ratio of No. 1 cylinder. However, flag FR1 in this embodiment is different from the flag FR1 in FIG. 4 in that the flag FR1 is set to one of three values 0, 1, and 2 in this embodiment. When the flag FR1 is set at 0, No. 1 cylinder is operated at a lean air-fuel ratio of $\lambda \approx 1.3$–1.4 and, when the flag FR1 is set at 1, No. 1 cylinder is operated at a slightly rich air-fuel ratio of $\lambda \approx 0.95$. Further, in this embodiment, when the flag FR1 is set at 2, No. 1 cylinder is operated at a considerably rich air-fuel ratio of $\lambda \approx 0.8$–0.9.

Therefore, when the switching valve 145 is set to the position where the exhaust gas from No. 1 cylinder is directed to the $NO_x$ absorbent 3 at step 802 and the flag FR1 is set to 0 at step 803, all the cylinders No. 1 through No. 4 are operated at a lean air-fuel ratio of $\lambda \approx 1.3$–1.4, and the exhaust gas from No. 1 through No. 4 cylinders is all supplied to $NO_x$ absorbent 3. Thus, all of the $NO_x$ in the exhaust gas from the engine is absorbed by the $NO_x$ absorbent 3 (the section I in FIG. 7).

Steps 805 and 807 are the steps for calculating the amount N of $NO_x$ held in the $NO_x$ absorbent 3. Although these steps are similar to the steps 405 and 407, they are different from steps 405 and 407 in that $NA_i$, which is the amount of $NO_x$ produced by all the cylinders No. 1 through No. 4 per unit time is accumulated instead of $N_i$ (the amount of $NO_x$ produced by No. 2 to No. 4 cylinders per unit time).

Steps 809 through 813 are steps for starting the regenerating operation of $NO_x$ absorbent 3. These steps are the same as steps 409 through 413 in FIG. 4, and the detailed explanation is omitted.

Steps 815 to 819 represent the operation during the $NO_x$ spillage period of the $NO_x$ absorbent 3 (the section IIa in FIG. 7). In this embodiment, the switching valve 145 is set to the three-way catalyst 5 side position (i.e., the position where the exhaust gas from No. 1 cylinder is directed to the three-way catalyst 5) during the $NO_x$ spillage period at step 816, and the value of the rich air-fuel ratio operation of No. 1 cylinder FR1 is set at 1 at step 818. Further, the secondary air is supplied to the denitrating catalyst 7 (step 819).

Thus, the slightly rich air-fuel ratio exhaust gas of $\lambda = 0.95$ from No. 1 cylinder is supplied to the three-way catalyst 5 and $NH_3$ is produced during the $NO_x$ spillage period, and the $NH_3$ produced at the three-way catalyst 5 and $NO_x$ released by the $NO_x$ spillage of $NO_x$ absorbent 3 flow into the denitrating catalyst 7.

Steps 821 through 825 represent the regenerating operation after the $NO_x$ spillage of $NO_x$ absorbent 3 completes (the section IIb in FIG. 7). In this embodiment, the switching valve 145 is set to the $NO_x$ absorbent 3 side position (i.e., the position where the exhaust gas from No. 1 cylinder is directed to $NO_x$ absorbent 3) (step 822) and the value of the flag FR1 is set to 2 (step 825) during the period from the time when the value of the counter TN becomes TN≦0 until the value of the counter TR becomes TR≦0). Thus, No. 1 cylinder is operated at a considerably rich air-fuel ratio ($\lambda \approx 0.8$–0.9) during this period, and the rich air-fuel ratio exhaust gas from No. 1 cylinder is supplied to $NO_x$ absorbent 3. Therefore, all the cylinders No. 1 to No. 4 are operated at a considerably rich air-fuel ratio and the exhaust gas of all the cylinders are supplied to the $NO_x$ absorbent 3 during the regenerating operation after the $NO_x$ spillage completes.

Further, when the time required for the regeneration of the $NO_x$ absorbent 3 has lapsed, i.e., when the value of the counter TR becomes TR≦0 at step 821, steps 829 through 832 are performed. Namely, the lean air-fuel ratio operation flag FL2 of No. 2 to No. 4 cylinders are set to 1 (step 829), the $NO_x$ amount N is cleared (step 831) and secondary air is stopped (step 832). Thus, when the routine is executed next, steps 802 and thereafter are executed and the $NO_x$ absorbing operation is restarted.

Though the present invention has been described with reference to specific embodiments selected for the purpose of illustration, it should be understood that numerous modifications could be applied by those skilled in the art without departing from the basic concept and scope of the present invention. For example, the denitrating catalyst 7 in the above embodiments uses at least one substance selected from elements belong to the fourth period or the eighth group in the periodic table of elements as a catalytic element, but other type of the denitrating catalyst such as the denitrating catalyst using vanadium oxide and titanium dioxide ($V_2O_5/TiO_2$), or the denitrating catalyst which uses copper Cu and zeolite may be used.

We claim:

1. A method for purifying combustion exhaust gas comprising:

a step for contacting an exhaust gas having a lean air-fuel ratio with a $NO_x$ absorbent to cause the $NO_x$ absorbent to absorb $NO_x$ in the exhaust gas, wherein said $NO_x$ absorbent absorbs $NO_x$ in an exhaust gas when an air-fuel ratio of an exhaust gas is lean and releases the absorbed $NO_x$ when an air-fuel ratio of an exhaust gas becomes rich and wherein said $NO_x$ absorbent releases the absorbed $NO_x$ without reducing it during a short period after an air-fuel ratio of an exhaust gas is changed from a lean air-fuel ratio to a rich air-fuel ratio and releases the absorbed $NO_x$ after reducing it to $N_2$ and $H_2O$ after said short period has lapsed;

a step for causing the air-fuel ratio of the exhaust gas contacting said $NO_x$ absorbent to be a rich air-fuel ratio in order to make the $NO_x$ absorbent release the absorbed $NO_x$;

a step for supplying $NH_3$ to the exhaust gas after it contacts said $NO_x$ absorbent during said short period in which the $NO_x$ absorbed in the $NO_x$ absorbent is released without being reduced; and a step for contacting the exhaust gas after $NH_3$ is added with a $NO_x$ purifying means which reduces $NO_x$ in the exhaust gas by reacting the $NO_x$ with $NH_3$ in the exhaust gas to, thereby, reduce the $NO_x$ released from the $NO_x$ absorbent in said short period by said $NO_x$ purifying means.

2. A device for purifying a combustion exhaust gas comprising:

a $NO_x$ absorbent disposed on an exhaust gas passage, said $NO_x$ absorbent absorbs $NO_x$ in an exhaust gas when an air-fuel ratio of an exhaust gas is lean and releases the absorbed $NO_x$ when an air-fuel ratio of an exhaust gas becomes rich and wherein said $NO_x$ absorbent releases the absorbed $NO_x$ without reducing it during a short period after the air-fuel ratio of the exhaust gas is changed from a lean air-fuel ratio to a rich air-fuel ratio and releases the absorbed $NO_x$ after reducing it to $N_2$ and $H_2O$ after said short period has lapsed;

$NO_x$ purifying means disposed on the exhaust gas passage downstream of the $NO_x$ absorbent and for reducing $NO_x$ in an exhaust gas by reacting it with $NH_3$;

air-fuel ratio adjusting means for adjusting the air-fuel ratio of the exhaust gas flowing into the $NO_x$ absorbent to a lean air-fuel ratio in order to make the $NO_x$ absorbent absorb $NO_x$ in the exhaust gas and for adjusting the air-fuel ratio of the exhaust gas flowing into the $NO_x$ absorbent to a rich air-fuel ratio in order to make the $NO_x$ absorbent release the absorbed $NO_x$; and a $NH_3$ supply means for supplying $NH_3$ to the exhaust gas in the exhaust gas passage at the portion between the $NO_x$ absorbent and the $NO_x$ purifying means during said short period in which the $NO_x$ absorbed in the $NO_x$ absorbent is released without being reduced, whereby the $NO_x$ purifying means reduces the $NO_x$ released from the $NO_x$ absorbent without being reduced during said short period.

3. A device for purifying an exhaust gas from an internal combustion engine having a plurality of cylinder groups, each of the cylinder groups consists of one or more cylinders, said device comprising:

a first exhaust gas passage connected to one cylinder group of the engine;

a second exhaust gas passage connected to another cylinder group of the engine;

a common exhaust gas passage to which the first and the second exhaust gas passages merge;

a $NH_3$ generating means disposed on the first exhaust gas passage for converting at least a part of $NO_x$ in an exhaust gas to $NH_3$ when an air-fuel ratio of an exhaust gas is a rich air-fuel ratio;

a $NO_x$ absorbent disposed on the second exhaust gas passage, said $NO_x$ absorbent absorbs $NO_x$ in an exhaust gas when an air-fuel ratio of an exhaust gas is lean and releases the absorbed $NO_x$ when an air-fuel ratio of an exhaust gas becomes rich and, wherein said $NO_x$ absorbent releases the absorbed $NO_x$ without reducing it during a short period after the air-fuel ratio of the exhaust gas is changed from a lean air-fuel ratio to a rich air-fuel ratio and releases the absorbed $NO_x$ after reducing it to $N_2$ and $H_2O$ after said short period lapses;

$NO_x$ purifying means disposed on the common exhaust gas passage and for reaction $NO_x$ with $NH_3$ in an exhaust gas to, thereby, reduce $NO_x$ in the exhaust gas;

a first air-fuel ratio adjusting means for operating the cylinder group connected to the second exhaust gas passage at a lean air-fuel ratio in order to make the $NO_x$ absorbent absorb $NO_x$ in the exhaust gas, and operation the same at a rich air-fuel ratio in order to make the $NO_x$ absorbent release the absorbed $NO_x$;

a second air-fuel ratio adjusting means for operating the cylinder group connected to the first exhaust gas passage at a rich air-fuel ratio during said short period in which the $NO_x$ absorbed in the $NO_x$ absorbent is released without being reduced to, thereby, reduces the $NO_x$ released from the $NO_x$ absorbent by said $NO_x$ purifying means.

4. A device according to claim 3, wherein said second air-fuel ratio adjusting means operates the cylinder group connected to the first exhaust gas passage at a rich air-fuel ratio during a predetermined period after said first air-fuel ratio adjusting means changes the air-fuel ratio of the cylinder group connected to the second exhaust gas passage from a lean air-fuel ratio to a rich air-fuel ratio, and wherein said second air-fuel ratio adjusting means changes the air-fuel ratio of the cylinder group connected to the first exhaust gas passage from a rich air-fuel ratio to a lean or a stoichiometric air-fuel ratio when said predetermined period has lapsed.

5. A device according to claim 3, further comprising:

exhaust switching means for connecting said one cylinder group to the first exhaust gas passage and the second exhaust gas passage selectively;

switching control means for controlling the exhaust switching means and the second air-fuel ratio adjusting means in such a manner that:

(a) when said first air-fuel ratio adjusting means operates said another cylinder group at a lean air-fuel ratio, the exhaust switching means connects said one cylinder group to the second exhaust gas passage and the second air-fuel ratio adjusting means operates said one cylinder group at a lean air-fuel ratio; and (b) when said first air-fuel ratio adjusting means changes the air-fuel ratio of said another cylinder group from a lean air-fuel ratio to a rich air-fuel ratio, the exhaust switching means connects said one cylinder group to the first exhaust gas passage and said second air-fuel ratio adjusting means switches the air-fuel ratio of said one cylinder group from a lean air-fuel ratio to a rich air-fuel ratio.

* * * * *